United States Patent
Shekher et al.

(10) Patent No.: US 9,447,771 B2
(45) Date of Patent: *Sep. 20, 2016

(54) PIEZOELECTRIC-BASED WIND TURBINE

(71) Applicants: Vinod Shekher, Huntsville, AL (US); Rahul Shekher, Redwood City, CA (US)

(72) Inventors: Vinod Shekher, Huntsville, AL (US); Rahul Shekher, Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/806,654

(22) Filed: Jul. 23, 2015

(65) Prior Publication Data

US 2015/0322918 A1 Nov. 12, 2015

Related U.S. Application Data

(63) Continuation of application No. 14/492,059, filed on Sep. 21, 2014, now Pat. No. 9,115,692.

(60) Provisional application No. 61/881,951, filed on Sep. 24, 2013.

(51) Int. Cl.
*F03D 1/06* (2006.01)
*F03D 9/00* (2016.01)
*F03D 3/00* (2006.01)

(52) U.S. Cl.
CPC ............. *F03D 1/0675* (2013.01); *F03D 3/005* (2013.01); *F03D 9/002* (2013.01); *F05B 2220/709* (2013.01); *Y02B 10/30* (2013.01); *Y02B 10/70* (2013.01); *Y02E 10/721* (2013.01); *Y02E 10/74* (2013.01)

(58) Field of Classification Search
CPC .......... F03D 3/00; F03D 3/061; F03D 3/062; F03D 1/06; F03D 1/065; F03D 9/021
USPC ............. 415/4.2, 4.3, 2.1, 7, 907; 416/7, 11, 416/223 R, 241 R, 241 A
See application file for complete search history.

(56) References Cited

U.S. PATENT DOCUMENTS

| | | | | | |
|---|---|---|---|---|---|
| 3,230,402 | A | * | 1/1966 | Nightingale | .......... H01L 41/113 310/338 |
| 3,350,583 | A | * | 10/1967 | Schiavone | .............. F23Q 2/287 310/319 |
| 7,098,553 | B2 | * | 8/2006 | Wiegel | .................... F03D 3/002 290/44 |
| 2005/0270175 | A1 | * | 12/2005 | Peddie | .................... E01F 9/065 340/907 |

FOREIGN PATENT DOCUMENTS

DE 10330128 A1 * 1/2005 .............. G01W 1/14

* cited by examiner

*Primary Examiner* — Nathaniel Wiehe
*Assistant Examiner* — Woody A Lee, Jr.

(57) ABSTRACT

A system and method for a piezoelectric-based vertical axis wind turbine (VAWT) are disclosed. The piezoelectric-based VAWT may generate electricity in response to a deformation (e.g., a stretching or bending) of piezoelectric material. For example, the piezoelectric material may be included on or within a wind turbine blade. The wind turbine blade may be struck by an object or may hit an object. Such an action may cause the wind turbine blade to vibrate and subsequently cause the piezoelectric material to deform and generate electricity.

7 Claims, 13 Drawing Sheets

PIEZOELECTRIC-BASED WIND TURBINE

RELATED APPLICATION

This application is a continuation of U.S. patent application Ser. No. 14/492,059 filed on Sep. 21, 2014 which claims the benefit of U.S. Provisional Application No. 61/881,951 filed on Sep. 24, 2013, the entire contents of which are incorporated by reference.

FIELD

The present disclosure is related to the field of power generation. In some embodiments, the present disclosure relates to a piezoelectric-based vertical axis wind turbine.

BACKGROUND

Conventional wind turbines utilize the wind to generate electricity or power. One or more blades of a conventional wind turbine may be used to catch the wind and to cause the wind turbine blades to turn around a rotor. The force of the wind to turn the blades results in the transfer of wind energy to the rotor and causes the rotor to spin. The rotor may also be connected to a shaft such that when the rotor spins, the shaft spins as well and mechanical and rotational energy is transferred from the rotor to the shaft, which is connected to an electrical generator on the other end.

Conventional wind turbines are large structures and that may also include many moving parts. Such conventional wind turbines may not be desirable for powering certain components or devices in various environments. For example, such conventional wind turbines may not be placed on structures such as bridges or buildings to power a sensor due to the larger footprint or area of the conventional wind turbines. Additionally, the many moving parts of a conventional wind turbine may require frequent maintenance. Furthermore, powering the sensor may not require the electricity generation capability of a conventional wind turbine.

As such, what is needed is an apparatus to provide a local source of electricity or power with less mechanical complexity and some degree of portability.

SUMMARY

An apparatus may include one or more wind turbine blades configured to rotate along an axis. In some embodiments, the one or more wind turbine blades includes at least some piezoelectric material. One or more objects may be in a path associated with the one or more wind turbine blades. Furthermore, the one or more wind turbine blades may strike against the one or more objects in the path as the one or more wind turbine blades rotate along the axis so that the piezoelectric material is associated with at least some mechanical stress in response to the striking of the one or more wind turbine blades against the one or more objects.

In some embodiments, an application of the mechanical stress to the piezoelectric material results in an electric discharge from the piezoelectric material.

In some embodiments, the one or more wind turbine blades further may include at least some metal. Furthermore, the piezoelectric material may cover a portion of the metal so that when the one or more wind turbine blades may strike or hit against the one or more objects, the objects makes an impact on the metal of the one or more objects that is not covered by the piezoelectric material.

In some embodiments, the electric discharge may power a sensor.

In some embodiments, the axis is a vertical axis.

BRIEF DESCRIPTION OF THE DRAWINGS

The novel features of the disclosure are set forth in the appended claims. However, for purpose of explanation, several embodiments of the disclosure are set forth in the following figures.

DETAILED DESCRIPTION

The systems and methods disclosed herein relate to power generation. In some embodiments, the systems and methods relate to a piezoelectric-based vertical axis wind turbine.

In the following detailed description, numerous specific details are set forth in order to provide a thorough understanding of the present disclosure. However, it will become obvious to those skilled in the art that the present disclosure may be practiced without these specific details. The description and representation herein are the means used by those experienced or skilled in the art to most effectively convey the substance of their work to others skilled in the art. In other instances, well known methods, procedures, and systems have not been described in detail to avoid unnecessarily obscuring aspects of the present disclosure.

Figure 1A:
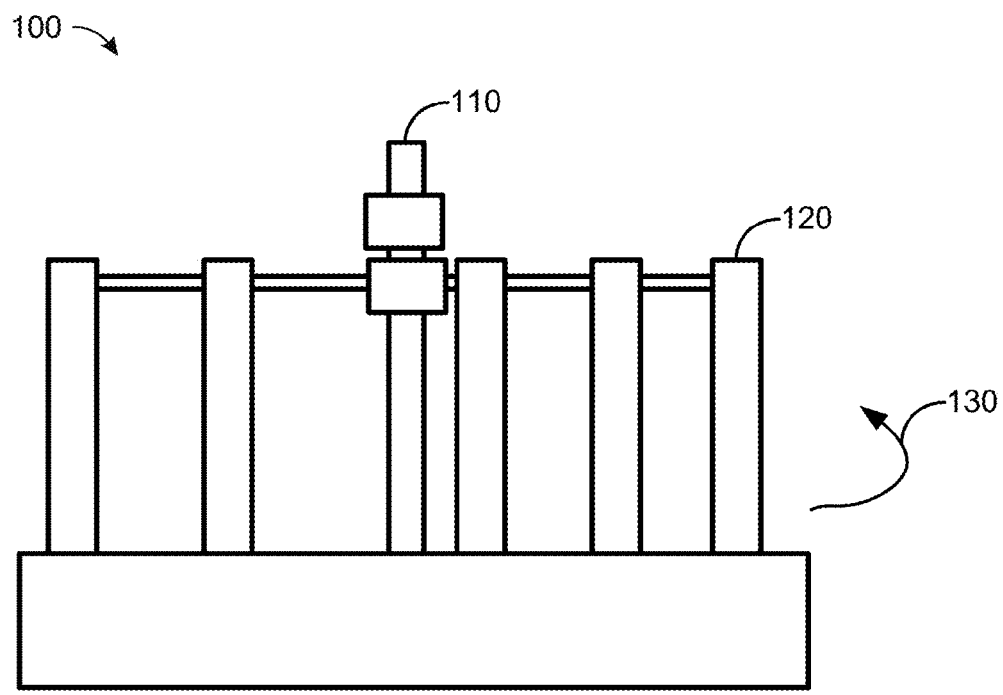
FIG. 1A illustrates a piezoelectric-based vertical axis wind turbine in accordance with some embodiments.

FIG. 1A illustrates an example piezoelectric-based vertical axis wind turbine (VAWT) 100 from a side view perspective. In general, the piezoelectric-based VAWT may utilize wind forces (e.g., a gust) to turn one or more blades and to apply a mechanical stress (e.g., to twist, bend, and/or cause a vibration) on a piezoelectric material in response to the turning of the one or more blades.

As shown in FIG. 1A, the piezoelectric-based VAWT 100 may include one or more blades 120 and a rotor 110. In some embodiments, the blades 120 may turn in response to a gust of wind and the rotor 110 may turn in response to the turning or rotating of the blades 120. The blades 120 may be placed in a vertical or substantially vertical position and turn or spin around a vertical axis. For example, the blades 120 may turn or rotate around a vertical axis (e.g., the rotor 110) in the direction 130. As such, the blades 120 may be arranged to rotate around a vertical axis and may further be positioned to stand upright or vertically (or substantially upright or vertical).

Figure 1B:
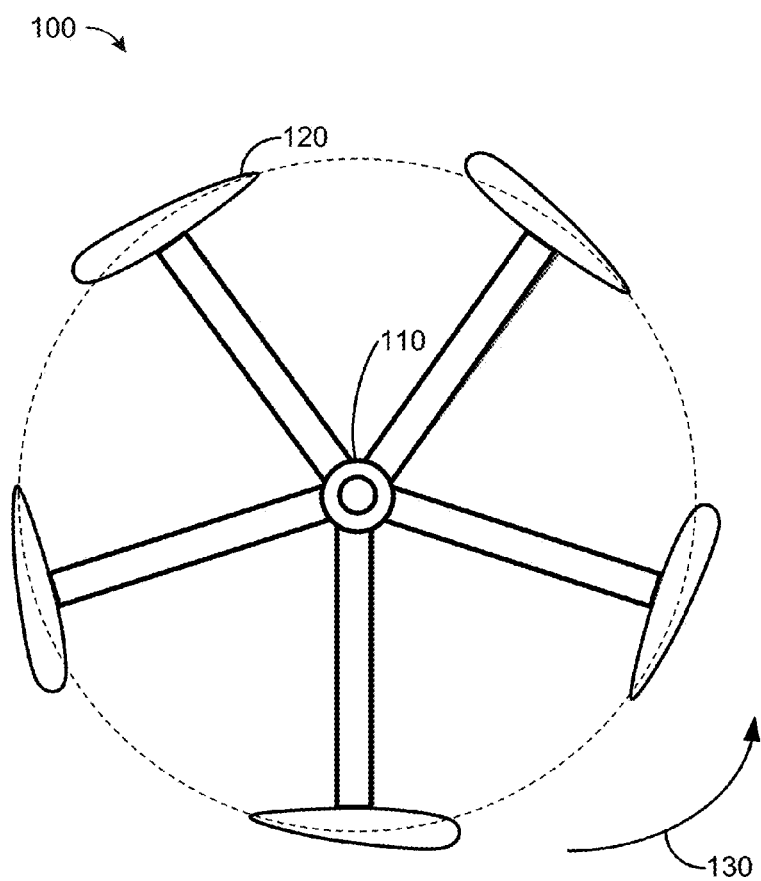
FIG. 1B illustrates an overhead view of a piezoelectric-based vertical axis wind turbine in accordance with some embodiments of the disclosure.

FIG. 1B illustrates a piezoelectric-based vertical axis wind turbine 100 from an overhead view perspective. As shown, the piezoelectric-based VAWT 100 includes the blades 120 arranged around a vertical axis and rotor 110. Wind forces may push or create a lift force causing the blades 120 to spin (i.e., turn) around the vertical axis in the direction 130.

Figure 2A:
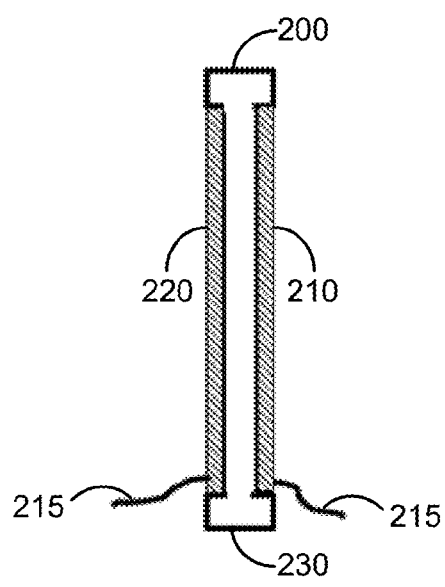
FIG. 2A illustrates a block diagram of a piezoelectric component of a piezoelectric-based vertical axis wind turbine in accordance with some embodiments.

FIG. 2A illustrates a block diagram of a piezoelectric component 200 of a piezoelectric-based vertical axis wind turbine (e.g., VAWT 100) in accordance with some embodiments. In general, the piezoelectric component 200 may include piezoelectric material upon which mechanical stress may be placed or applied upon the piezoelectric material to generate electricity. In some embodiments, the piezoelectric component 200 may be a wind turbine blade as discussed herein.

As shown, the piezoelectric component 200 may include piezoelectric materials 210 and 220 and metal material 230. Although the present disclosure refers to metal material, alternative materials may also be used. For example, fiber reinforced plastics may be used. In some embodiments, the metal material 230 may be longer or larger than the piezoelectric materials 210 and 220. For example, the metal material 230 may extend further than the piezoelectric materials 210 and 220. In some embodiments, the piezoelectric materials 210 and 220 may be strips of piezoelectric material that do not cover the entire surface of the metal material 230 such that a portion of the metal material 230 is not covered by any piezoelectric material and another portion of the metal material 230 is covered by the piezoelectric materials.

Furthermore, in some embodiments, wires may be coupled to the piezoelectric material 210 and 220. For example, a wire 225 may be connected to the piezoelectric material 220 or an electrode embedded on or within the piezoelectric material 220 and a wire 215 may be connected to the piezoelectric material 210 or an electrode embedded on or within the piezoelectric material 210. In some embodiments, a wire may be connected to the metal material 220. Electric charge generated by the piezoelectric materials 210 and 220 may be collected by the wires. For example, the charge released by the piezoelectric materials 210 and 220 may be conducted through the wires 215 and 225 to a battery or power source component of a sensor.

In some embodiments, the piezoelectric material may include, but is not limited to, ceramics, crystals, polymers, nanostructures, or other materials. For example, the piezoelectric materials may be a naturally occurring crystal including, but not limited to, Berlinite, Sucrose, Quartz, Rochelle salt, Topaz, and Tourmaline-group minerals. In some embodiments, the piezoelectric materials may be a biological material. In alternative embodiments, the piezoelectric materials may be synthetic crystals or synthetic ceramics. Examples of synthetic crystals include, but are not limited to, Gallium orthophosphate and Langasite. Examples of synthetic ceramics include, but are not limited to, ceramics with perovskite or tungsten-bronze structures such as Barium titanate, lead titanate, lead zirconate titanate (PZT), potassium niobate, lithium niobate, lithium tantalite, sodium tungstate, and zinc oxide. The piezoelectric materials may further be a lead free ceramic including, but not limited to, sodium potassium niobate, bishmuth ferrite, sodium niobate, bishmuth titanate, and sodium bishmuth titanate. Further examples of the piezoelectric material include polymers such as Polyvinylidene fluoride and organic nanostructures such as self-assembled diphenylalanine peptide nanotubes.

In some embodiments, the piezoelectric material may be poled in the direction of the thickness of the piezoelectric material used.

Figure 2B:
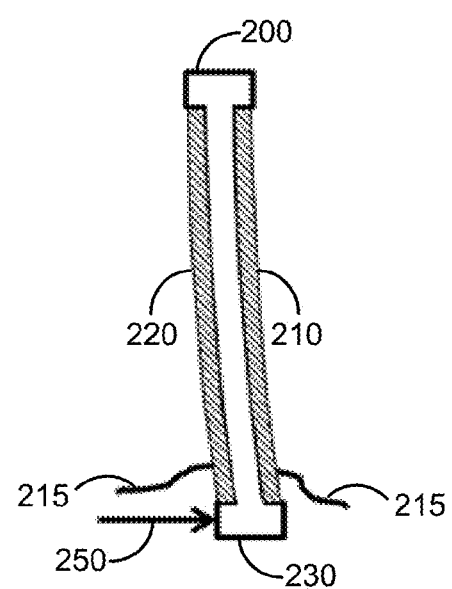
FIG. 2B illustrates a block diagram of the striking of the piezoelectric component to generate electricity in accordance with some embodiments.

FIG. 2B illustrates a block diagram of the piezoelectric component 200 having a mechanical stress applied to it to generate electricity. As shown, a force 250 may apply mechanical stress to the piezoelectric component 200. In some embodiments, the force 250 may be in result of a striking (i.e., hitting, making an impact) and of the piezoelectric component 200 by an object (e.g., a component of the VAWT) or the piezoelectric component 200 striking an object and gliding over the object. In response to the application of the mechanical stress from the impact of the piezoelectric component 200 with an object, the piezoelectric component 200 may bend, twist, and/or vibrate. In some embodiments, the vibration of the piezoelectric component 200 may cause a mechanical stress to be applied to the piezoelectric material 210 and 220. For example, the piezoelectric materials 210 and 220 may stretch, compress, and/or bend in response to the vibrations of the piezoelectric component 200 and, in response to the stretching, compressing, and/or bending caused by the application of the mechanical stress, the piezoelectric materials 210 and 220 may internally generate an electric charge (i.e., electricity). Furthermore, the electric charge may be conducted through the wires 215 and 225 to a battery or another source (e.g., to power a sensor).

In some embodiments, the force 250 may be directed towards the metal material 230 of the piezoelectric component 200. For example, the force 250 may be directed towards the portion of the metal material 230 that is not covered by any piezoelectric material 210 or 220. As such, an impact or force may be applied to the metal material of the piezoelectric component 200 so that there is not any direct impact with the piezoelectric material 210 or 220. In some embodiments, the application of the force to the metal material 230 may result in the mechanical stress being applied to the piezoelectric component 200 and the subsequent stretching, compressing, or bending of the piezoelectric materials 210 and 220 along with the bending or twisting of the metal material 230. Such a configuration where the force 250 is applied to a metal portion of the piezoelectric component 200 instead of the piezoelectric portions may ensure that damage to the piezoelectric portions is reduced. For example, certain piezoelectric materials may be brittle and a direct impact by a force 250 may result in the damaging of the piezoelectric materials. By arranging the piezoelectric components or an object that the piezoelectric component will make an impact with at positions where the force of the impact will be at the metal portions will preserve the piezoelectric portions.

As such, in some embodiments, a non-piezoelectric portion (e.g., metal or other material) of a piezoelectric component or a wind turbine blade may be hit or struck by an object. The non-piezoelectric portion may then vibrate and cause a deformation in the piezoelectric material that is placed on or within the non-piezoelectric material. For example, the housing of a wind turbine blade may be made of a first type of material (e.g., metal). Piezoelectric material may be placed on top of or within the first type of material. The wind turbine blade may strike or hit an object such that the object hits or strikes a portion of the first type of material. The first type of material may then vibrate and in response to the vibrating, the piezoelectric material either on or within the first type of material may deform (e.g., stretch, bend, etc.).

In some embodiments, the piezoelectric component 200 may be included on a blade (e.g., blade 120) of a VAWT. In the same or alternative embodiments, the blade of a VAWT (e.g., VAWT 100) may be the piezoelectric component 200 itself or at least one piezoelectric material (e.g., a strip 210 or 220) may be placed on the blade of a VAWT. As such, the piezoelectric component 200 may itself be vertically arranged to turn along a vertical axis and coupled to a rotor of a VAWT. The piezoelectric component 200 may be positioned such that when the blade of the VAWT turns, the metal portion of the piezoelectric component 200 is struck by an object that applies a mechanical stress to the piezoelectric material resulting in the generation of an electric charge.

In some embodiments, the blade or piezoelectric component may include a non-metal material. For example, a blade or piezoelectric component may contain an insulator or non-metal portion instead of the metal portion as previously disclosed with piezoelectric material on each side of the insulator material. A metal material may then be placed over each of the piezoelectric material portions. Furthermore, in some embodiments, an electrode may be embedded in or positioned on the metal portion and be coupled to a wire for transmission of the generated electricity.

Figure 2C:
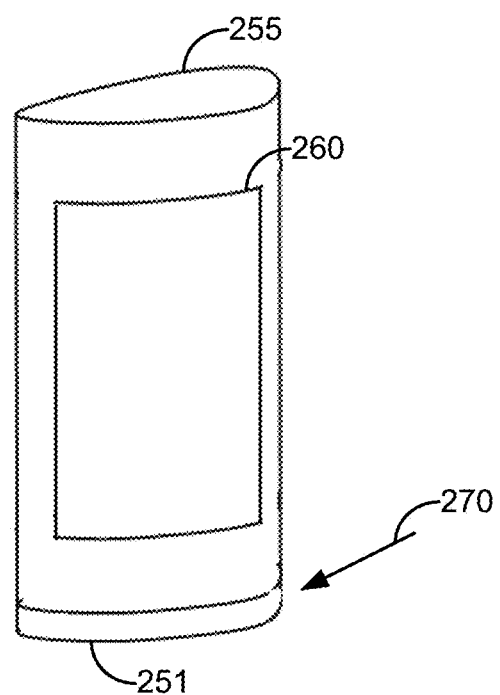
FIG. 2C illustrates a block diagram of a wind turbine blade of a piezoelectric-based VAWT in accordance with some embodiments.

FIG. 2C illustrates a block diagram of a blade 255 of a piezoelectric-based VAWT. As shown, the blade 255 may include a piezoelectric strip 260 that is attached to the metal portion of the blade 255. In some embodiments, the metal portion 251 of the blade 255 may be the location where an object will place a force 270 onto the blade 255. As such, the blade 255 may be part of a VAWT and may rotate around a vertical axis. The blade 255 may make an impact with an object at the metal portion 251 and the blade 255 may go over the object as the metal portion 251 slides over the object. In response to the blade 255 going over the object, the blade 255 may vibrate and cause the piezoelectric strip 260 to stretch, compress, or twist.

Figure 2D:
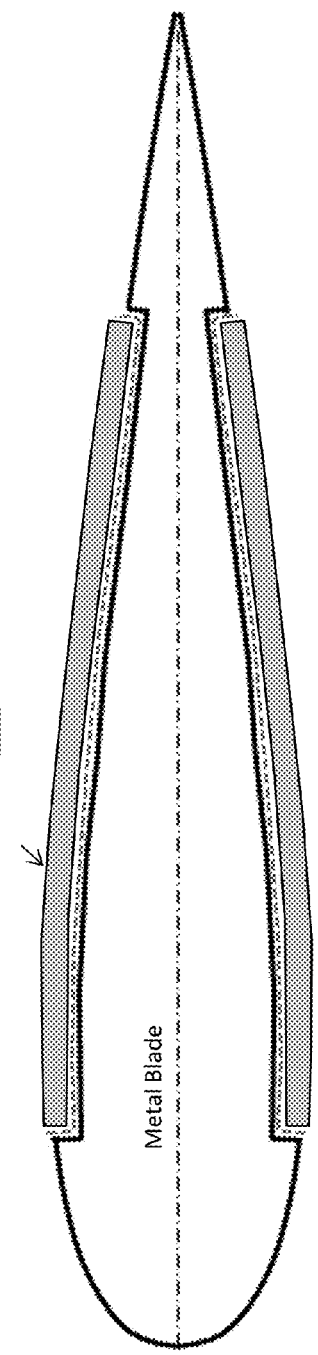
FIG. 2D illustrates an example wind turbine blade configuration in accordance with some embodiments.

FIG. 2D illustrates an example wind turbine blade configuration in accordance with some embodiments. As shown, the example wind turbine blade configuration may include a metal blade 275 with piezoelectric patches or components 276 embedded within the metal blade 275. In some embodiments, an insulation layer may also be between the piezoelectric patches or components 276 and the metal blade. In the same or alternative embodiments, the wind turbine blade configuration may include a piezoelectric patch or component on the top and the bottom of the wind turbine blade. FIG. 2D may represent a cross section of the wind turbine blade similar to FIG. 2C.

Figure 2E:
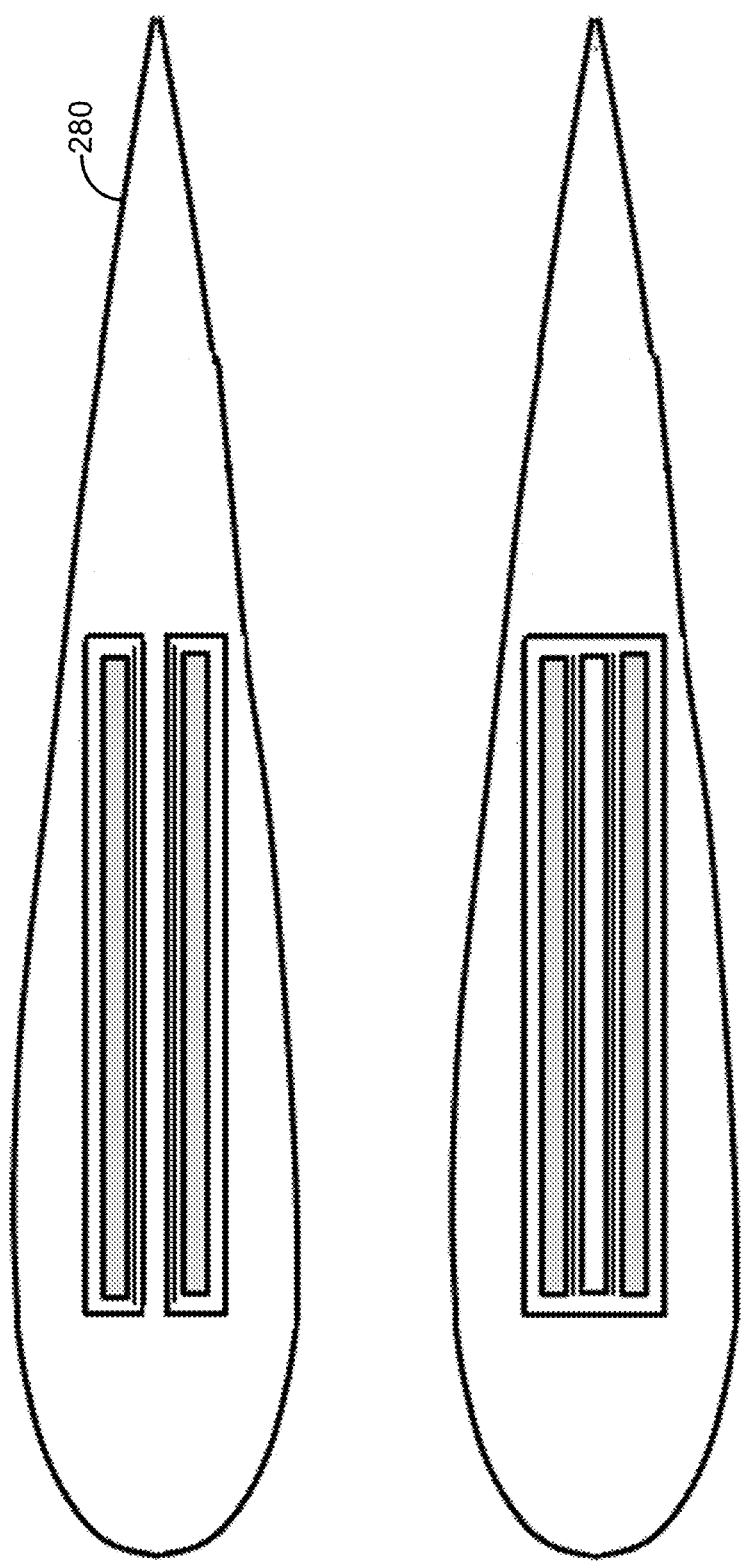
FIG. 2E illustrates another example of a wind turbine blade configuration in accordance with some embodiments.

FIG. 2E illustrates another example of a wind turbine blade configuration in accordance with some embodiments. In general, the example as shown in FIG. 2E is a wind turbine blade 280 with piezoelectric material or components in the interior of the wind turbine blade. For example, the wind turbine blade may include a hollow portion or slot in the body of the wind turbine blade such that a piezoelectric strip may be inserted into the slot of the wind turbine blade. As such, the piezoelectric material may be located in the interior of the wind turbine blade and may be removable and replaced as needed. In some embodiments, there may be multiple slots or one slot with multiple piezoelectric sheets within a single wind turbine blade. In some embodiments, the top (or bottom, side, etc.) portion of the wind turbine blade may be removable. Furthermore, the slot or slots may be accessible once the top portion of the wind turbine blade has been removed. As such, a portion of the wind turbine blade may be removed in order to reveal or access one or more slots for the inserting of piezoelectric material or sheets. In some embodiments, the removable portion of the wind turbine blade may be a core component that includes piezoelectric material and insulating material.

In some embodiments, the patches are along the length of the blade. For example, a thin strip of metal within the blade body may be coupled to the piezoelectric patches (e.g., the piezoelectric patches are attached to the metal). In some embodiments, the piezoelectric patches or materials may be poled in the thickness direction of the blade. Furthermore, in some embodiments, the wind turbine blade may act as an external mass for the piezoelectric segment of the wind turbine blade and may also provide an aerodynamic shape necessary for harnessing wind energy.

Figure 3:
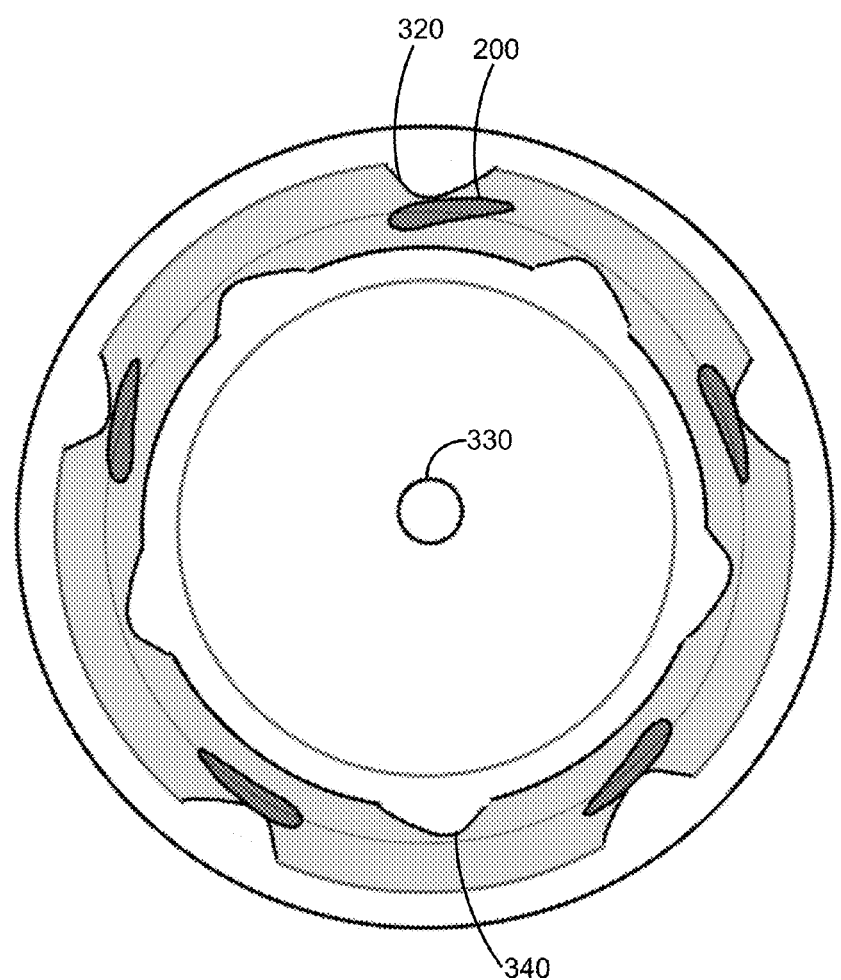
FIG. 3 illustrates an example configuration of a piezoelectric-based vertical axis wind turbine in accordance with some embodiments.

FIG. 3 illustrates an example configuration of a piezoelectric-based vertical axis wind turbine 300 in accordance with some embodiments. In general, the piezoelectric-based VAWT 300 may include at least one blade (e.g., piezoelectric component 200, blade 255, etc.) that includes at least some piezoelectric material such that when the blade turns, an impact is made between the blade and an object so that a mechanical stress is applied onto the piezoelectric material (e.g., piezoelectric material 210 and/or 220) of the blade.

As shown, the piezoelectric-based VAWT 300 may include a plurality of blades 200 coupled to a rotor 330. The blades 200 may turn or spin in response to a wind force pushing against the blades 200. As the blades 200 are coupled to the rotor 330, the rotor may also spin or turn in response to the turning of the blades 200 by the wind force. Furthermore, as shown, the piezoelectric-based VAWT 300 may also include at least one object 320. In some embodiments, the object 320 may be an object placed (i.e., embedded) into the housing or structure of the piezoelectric-based VAWT. In some embodiments, the object 320 may be considered a bump in the housing or inner structure (e.g., wall) of the piezoelectric-based VAWT 300. The object 320 may be positioned within the piezoelectric-based VAWT 300 so that when the blades 200 turns, at least one of the blades will strike or hit the object 320. For example, the placement of the object 320 may be such that the object will strike a metal portion (e.g., metal portion 230) of the blades 200 and not the piezoelectric portions (e.g., piezoelectric material 210 and 220) of the blades 200. The hitting or striking of the object 320 with the blade 200 may result in the application of a mechanical stress to the blade, and thus, to the piezoelectric material or component included in or on the blade 200. As such, electricity may be generated by the piezoelectric material as previously disclosed with relation to FIGS. 2A-2C. In some embodiments, the piezoelectric-based VAWT 300 may include interior and outer bumps or objects. For example, the piezoelectric-based VAWT 300 may include objects 320 and 340 to provide outer and inner objects or bumps in the path of the blades.

In some embodiments, the blades 200 may hit or strike against the objects 320 and/or 340 and may glide or over the objects 320 and/or 340. Such hitting or striking may cause vibrations (e.g., bending vibrations) in the blades 200 and such vibrating may cause further mechanical stress to the piezoelectric material.

Figure 4:
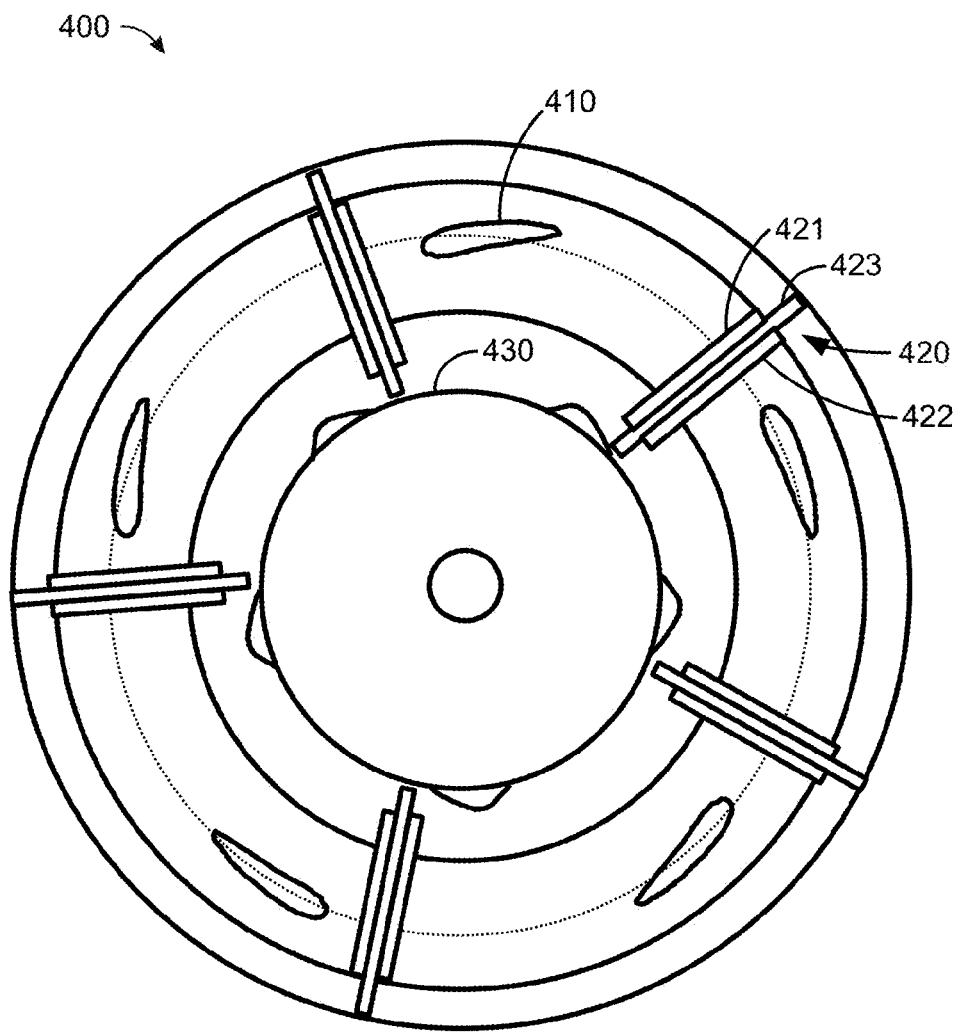
FIG. 4 illustrates another example configuration of a piezoelectric-based vertical axis wind turbine in accordance with some embodiments.

FIG. 4 illustrates another example configuration of a piezoelectric-based vertical axis wind turbine 400 in accordance with some embodiments. In general, the piezoelectric-based VAWT 400 may include one or more blades coupled to a rotor so that when the blades turn, a portion of the rotor may strike or make an impact with one or more piezoelectric components (e.g., piezoelectric components 200).

As shown, the piezoelectric-based VAWT 400 may include blades 410. In some embodiments, the blades 410 may be made of metal material. However, in alternative embodiments, the blades 200 may be made of any other type of material. The piezoelectric-based VAWT 400 may further include piezoelectric components 420 (which may also be piezoelectric components 200) and a rotor component 430. In some embodiments, the piezoelectric components 420 may include piezoelectric portions 421 and 422 and a metal portion 423 that is not covered by the piezoelectric portions 421 and 422. For example, the piezoelectric component 420 may include a central metal portion and piezoelectric strips attached or coupled to the sides of the central metal portion. However, the piezoelectric strips may only cover a segment of the metal portion such that the piezoelectric strips do not cover certain parts of the metal portion.

In operation, the blades 410 may turn in response to a wind force (e.g., a gust) and the rotor component 430 may turn as the rotor turns in response to the turning of the blades 410. As the rotor component 430 turns, the rotor component 430 may make an impact against the piezoelectric components 420. For example, the rotor component 430 may make an impact against the metal portion 423 that is not covered by the piezoelectric portions 421 and 422. As such, the rotor component 430 may include portions that extend outwards to strike the metal portion 423 of the piezoelectric components 420. As the metal portion 423 is impacted by the rotor component 430, mechanical stress is applied to the piezoelectric components 420, resulting in the stretching, compressing, and/or bending of the piezoelectric components 420 and the included piezoelectric portions 421 and 422. The resulting deformation (e.g., stretching, compressing, bending) of the piezoelectric portions 421 and 422 results in the generation of electricity.

In some embodiments, the piezoelectric components 420 may be positioned either horizontally or vertically. For example, as shown, the piezoelectric components 420 may be positioned horizontally underneath the blades 410. Alternatively, the piezoelectric components 420 may be positioned vertically such that the rotor component 430 may strike against the metal portion of the vertical piezoelectric components 420.

In some embodiments, the piezoelectric components 420 may be arranged or configured along the top or bottom of the piezoelectric-based VAWT 400. For example, the piezoelectric components 420 may be arranged radially at the bottom of the piezoelectric-based VAWT 400 and below the blades 410. Furthermore, a component (e.g., a cam or rotor component) may press down on portions of the piezoelectric components 420. For example, in response to the rotating of the blades 420, a compressing component within the piezoelectric-based VAWT 400 may move up and down. In some embodiments, the compressing component may press down on a portion of the piezoelectric components 420. For example, the compressing component may press down on the metal portion 423 or other such portion that is not covered by the piezoelectric portions 421 and/or 422. In response to the compressing, the metal portion 423 or other non-piezoelectric portion may vibrate, causing a deformation in the piezoelectric portions as previously discussed. As such, instead of the bumps or objects striking the blades as disclosed, the blades and rotor may not strike another object. Instead, the blades may continuously turn unimpeded in response to a wind gust and the turning of the blades may cause the compressing component to periodically move up and down such that a downward movement of the compressing component may cause the compressing component to hit or press down on the portion of the piezoelectric components 420 that does not cover piezoelectric material.

Figure 5:
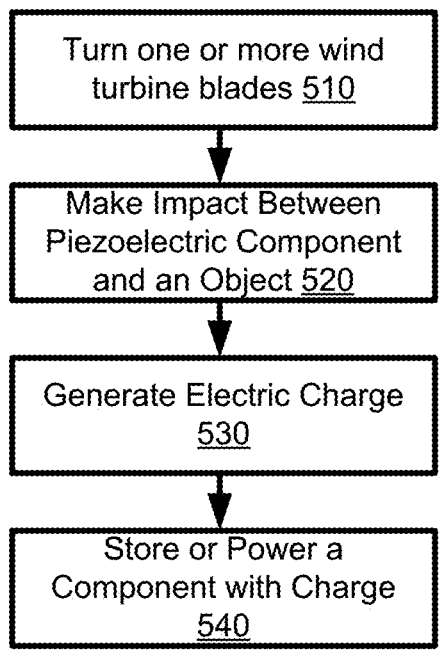
FIG. 5 illustrates an example flow diagram of a method of operation of a piezoelectric-based vertical axis wind turbine in accordance with some embodiments of the disclosure.

FIG. 5 illustrates an example flow diagram of a method 500 illustrating the operation of an example piezoelectric-based vertical axis wind turbine. In general, the method 500 may describe the operation of a piezoelectric-based VAWT (e.g., VAWT 300 and/or 400).

As shown in FIG. 5, the method 500 may involve the turning, at step 510, of one or more wind turbine blades. For example, a plurality of wind turbine blades of a vertical axis wind turbine may rotate or turn along a vertical axis in response to the wind flow against the wind turbine blades. In response to the turning of the wind turbine blades, at least one piezoelectric component may be hit or make an impact with another object at step 520. For example, the wind turbine blades may themselves include at least some piezoelectric material as previously disclosed with relation to FIG. 3. In another embodiment, a rotor or rotor component that turns in response to the turning of the wind turbine blades may hit or make an impact against a piezoelectric component as previously disclosed with relation to FIG. 4. At step 530, at least some piezoelectric material may generate an electric charge (i.e., electricity) in response to the impact of the piezoelectric component with an object. For example, the piezoelectric material may bend or twist in response to mechanical stress applied in response to the impact. At step 540, the generated electric charge may be received by a wire and, in turn, may be stored in a battery or to power another component (e.g., a sensor) as discussed in further detail below.

Figure 6:
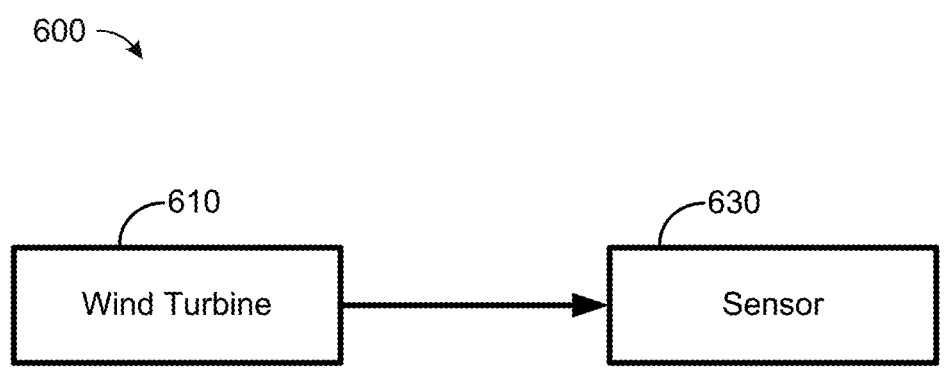
FIG. 6 illustrates an example system including a sensor powered by a piezoelectric-based vertical axis wind turbine in accordance with some embodiments.

FIG. 6 illustrates a system 600 including a sensor powered by a piezoelectric-based vertical axis wind turbine. In general, the system 600 may include at least one piezoelectric-based VAWT 610 (e.g., VAWT 300, 400, or any other type of piezoelectric-based VAWT) that is used as a power source for a sensor 630. The piezoelectric-based VAWT 610 may generate electricity in response to a wind force turning a blade of the piezoelectric-based VAWT 610 and resulting in mechanical stress applied to a piezoelectric material that generates electricity. The piezoelectric material may be connected to or coupled with a wire 630 that is connected or coupled to a battery or the sensor 630. As such, when the blades of the piezoelectric-based VAWT 610 turn in response to a wind force, the sensor 630 may be powered by the electric discharge of the piezoelectric material in the piezoelectric-based VAWT 610.

Figure 7:
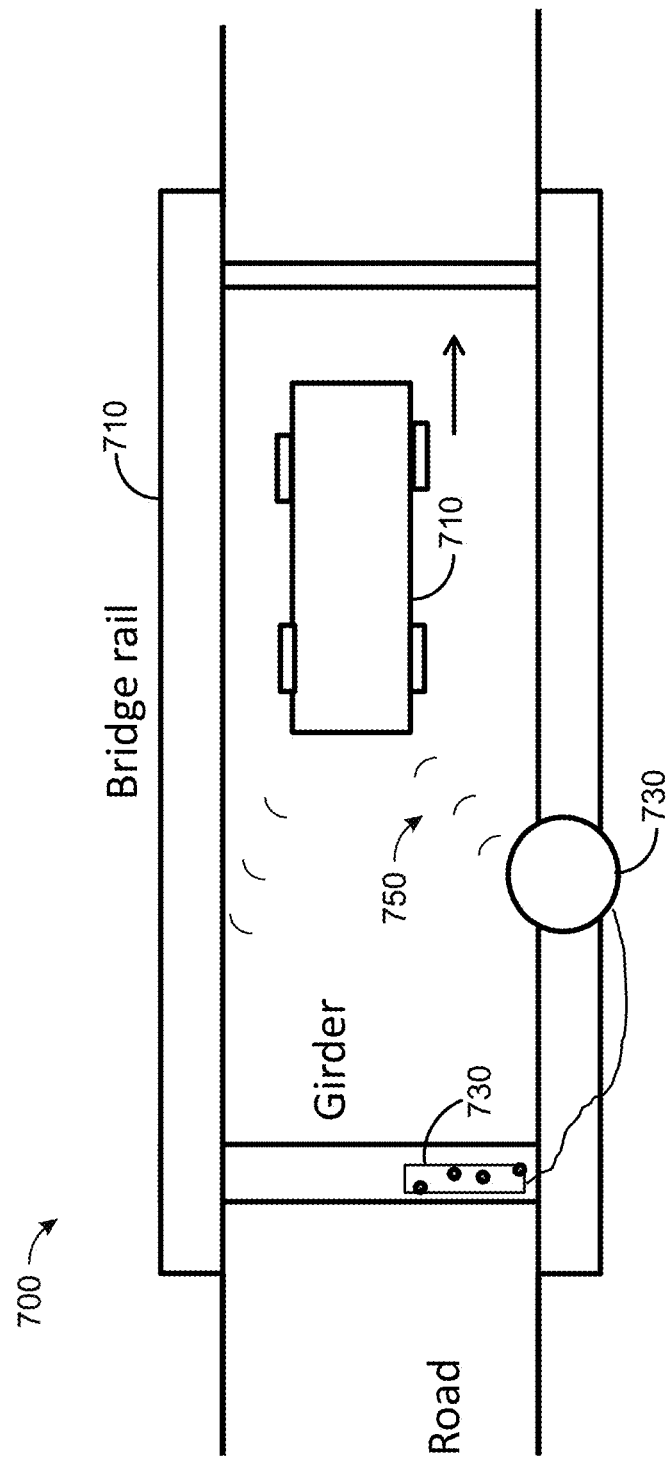
FIG. 7 illustrates an example environment in which one or more sensors powered by a piezoelectric-based vertical axis wind turbine may be placed in accordance with some embodiments of the disclosure.

FIG. 7 illustrates an environment 700 in which one or more sensors powered by a piezoelectric-based vertical axis wind turbine (e.g., VAWT 300 and/or 400) may be placed. In general, the environment 700 may include a structure with sensors on or near the structure to receive and/or analyze signals. The sensors may be used to monitor the structural integrity of the structure upon which the sensors are placed. As such, vibrations, acoustics, and any other type of signal may be received.

As shown, the environment 700 may include a structure 710. In some embodiments, the structure 710 may be a bridge. Although the disclosure generally relates to a bridge, one skilled in the art will recognize that the disclosure may be applied to any type of structure. For example, the structure 710 may be, but is not limited to, a building, roadway, aircraft, sea vessel, train, automobile, and so forth. The structure 710 may be monitored by a plurality of sensors 720 powered by piezoelectric-based VAWTs 730. For example, the piezoelectric-based VAWTs 730 may be arranged or placed at certain points on the structure 710 that are ideal for experiencing wind forces and the sensors 720 may be placed to receive vibration signals. For example, the sensors 720 may be placed at portions on the bridge for receiving vibration signals and the piezoelectric-based VAWTs 730 may be placed at a location where a wind gust from a passing vehicle 740 (e.g., a car, truck, etc.) may generate a wind force 750 against the blades of the piezoelectric-based VAWTs 730. As such, the passing of a vehicle by the piezoelectric-based VAWTs 730 on the structure 710 may generate a gust of wind that may create a wind force against the blades of piezoelectric-based VAWTs 730 that are coupled to each of the sensors 720. Thus, a piezoelectric-based VAWT may generate power in response to a wind gust from a passing vehicle and a corresponding sensor may detect a signal from the same passing vehicle (or from the structure when the passing vehicle is on it) that has created the wind gust.

Figure 8:
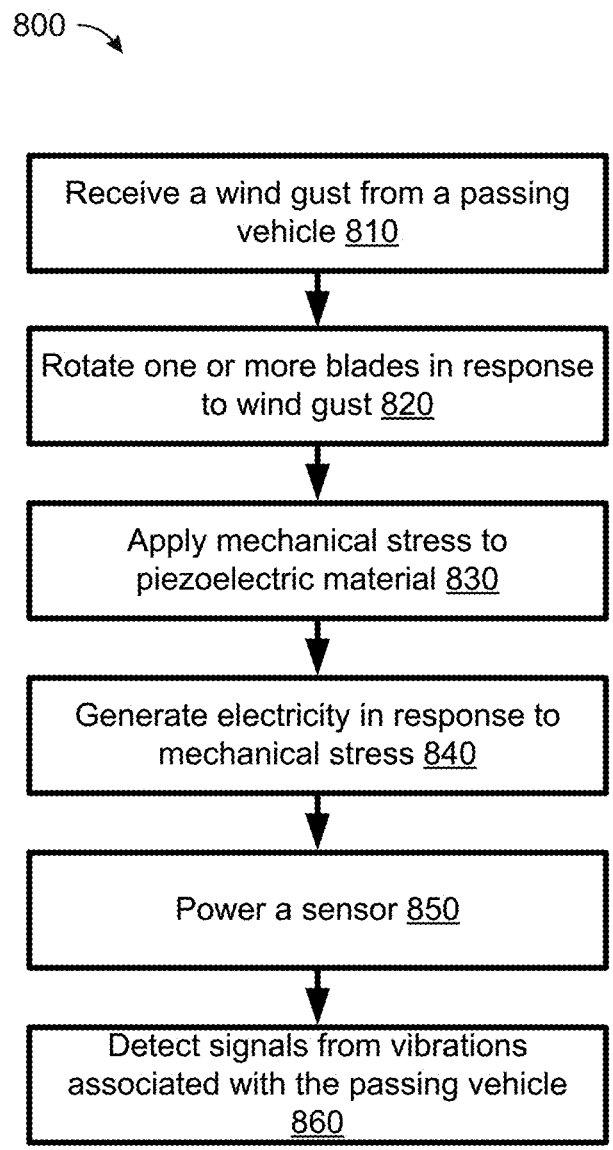
FIG. 8 illustrates a flow diagram of an example method to power a sensor from the wind gust of a passing vehicle and to detect a vibration associated with the passing vehicle in accordance with some embodiments.

FIG. 8 illustrates a flow diagram of a method 800 to power a sensor from the wind gust of a passing vehicle and to detect a vibration associated with the passing vehicle. As shown, the method 800 may receive, at step 810, a wind gust from a passing vehicle. For example, a piezoelectric-based VAWT (e.g., VAWT 300, 400, etc.) may be placed on a structure (e.g., structure 710). At step 820, one or more blades of the piezoelectric-based VAWT may turn, rotate, or spin in response to the wind gust of the passing vehicle. For example, the wind gust may push against the blades of the piezoelectric-based VAWT and cause the blades to rotate around a vertical axis. At step 830, a mechanical stress may be applied to a component including piezoelectric material and, at step 840, electricity may be generated from the application of the mechanical stress to the piezoelectric material. At step 850, the generated electricity may power a sensor. Furthermore, at step 860, the sensor may detect a vibration associated with the passing vehicle. As such, the sensor may be powered by the wind gust of the passing vehicle and may detect a vibration of the structure that is associated with the passing vehicle as it is driving through the structure. In some embodiments, the detection of the vibration of the structure may be used to identify the structural integrity of the structure.

Figure 9:
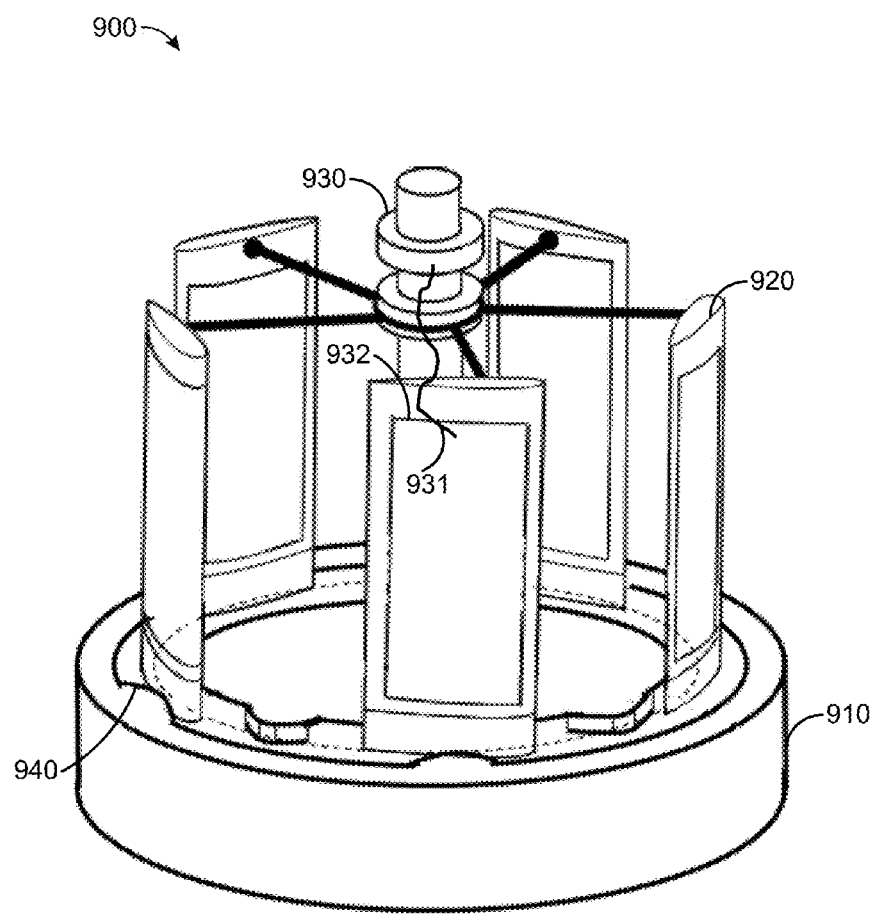
FIG. 9 illustrates another example piezoelectric-based VAWT in accordance with some embodiments.

FIG. 9 illustrates another example piezoelectric-based VAWT in accordance with some embodiments. In general, the piezoelectric-based VAWT 900 includes blades 920 with piezoelectric material or components, bumps or objects 940 in the path of the blades, a base 910, and a slip ring 930. In some embodiments, the blades 920 may rotate along a vertical or substantially vertical axis within the base 910. In some embodiments, the base 910 may also include objects or bumps 940 in the path of the blades 920 such that when the blades 920 rotate, one or more of the blades will strike against one of the bumps or objects 940. In the same or alternative embodiments, the piezoelectric components or material 932 on a blade 920 may be coupled to a wire 931. In some embodiments, the wire 931 is coupled or connected to a slip ring 930. The slip ring 930 may be a component in which a wire 931 from each of the piezoelectric material on each of the blades is connected to and the slip ring 930 may receive electricity generated from the piezoelectric material. In some embodiments, the electricity may then be transferred to a component in the base 910 and a subsequent connection from the base 910 may be used to power another device such as a sensor or a battery. In some embodiments, the slip ring is an electromechanical device that allows the transmission of power and electrical signals from a stationary to a rotating structure or from the rotating structure to the stationary structure. The slip ring may be used in any electromechanical system that requires unrestrained, intermittent or continuous rotation while transmitting power and/or data.

What is claimed is:

1. An apparatus comprising:
   a wind turbine blade comprising a first portion that comprises a piezoelectric material and a second portion that does not comprise the piezoelectric material; and
   a structure comprising one or more objects and the wind turbine blade, wherein the one or more objects are at a position within the structure that is in a path of the wind turbine blade.

2. The apparatus of claim 1, wherein the position of the one or more objects in the path of the wind turbine blade corresponds to the second portion of the wind turbine blade that does not comprise the piezoelectric material.

3. The apparatus of claim 1, wherein the first portion that comprises the piezoelectric material is inside of the second portion that does not comprise the piezoelectric material.

4. The apparatus of claim 1, wherein the one or more objects are coupled to a rotor associated with the housing.

5. The apparatus of claim 1, wherein the one or more objects are bumps in the structure.

6. The apparatus of claim 1, wherein the position of the one or more objects in the path of the wind turbine blade corresponds to the one or more objects striking the second portion of the wind turbine blade that does not comprise the piezoelectric material when the wind turbine blade rotates within the structure.

7. The apparatus of claim 1, wherein the apparatus is a vertical axis wind turbine.

* * * * *